US012782006B2

(12) United States Patent
Verma et al.

(10) Patent No.: US 12,782,006 B2
(45) Date of Patent: Nov. 3, 2026

(54) SYSTEM AND METHOD FOR COOLING A LOAD USING RENEWABLE ENERGY

(71) Applicant: Schlumberger Technology Corporation, Sugar Land, TX (US)

(72) Inventors: Sandeep Verma, Cambridge, MA (US); Gavin Rennick, Houston, TX (US); Marcus Jesen, New Plymouth (NZ)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/749,664

(22) Filed: Jun. 21, 2024

(65) Prior Publication Data

US 2025/0207819 A1 Jun. 26, 2025

Related U.S. Application Data

(60) Provisional application No. 63/569,831, filed on Mar. 26, 2024, provisional application No. 63/613,185, filed on Dec. 21, 2023.

(51) Int. Cl.
*F24S 60/10* (2018.01)
*F24S 40/55* (2018.01)
(Continued)

(52) U.S. Cl.
CPC ............... *F24S 60/10* (2018.05); *F24S 40/55* (2018.05); *F24S 60/30* (2018.05); *H02S 40/425* (2014.12); *H02S 40/44* (2014.12)

(58) Field of Classification Search
CPC . F24S 60/10; F24S 40/55; F24S 60/30; H02S 40/425; H02S 40/44
See application file for complete search history.

(56) References Cited

U.S. PATENT DOCUMENTS

| | | | | |
|---|---|---|---|---|
| 5,381,860 A * | 1/1995 | Mather | ............... | F28D 20/0039 62/99 |
| 2010/0288267 A1* | 11/2010 | Kanack | ................... | F24S 50/00 29/890.033 |

(Continued)

FOREIGN PATENT DOCUMENTS

| | | | | |
|---|---|---|---|---|
| CN | 110057003 A * | 7/2019 | ............ | F24S 70/225 |
| KR | 101829862 B1 * | 2/2018 | .............. | F25B 29/00 |
| WO | WO-2013014664 A2 * | 1/2013 | ............. | F01K 3/004 |

OTHER PUBLICATIONS

English machine translation of Chen (CN 110057003 A) (Year: 2025).*

(Continued)

*Primary Examiner* — Angelo Trivisonno
(74) *Attorney, Agent, or Firm* — Kyle R. Miiller

(57) ABSTRACT

A system may include a solar collector configured to receive sunlight, wherein the solar collector includes a solar thermal collector and a photovoltaic (PV) module. A system may include a hot energy storage (HES) configured to receive solar heat from the solar thermal collector and heat the HES to a first temperature range. A system may include a cold energy storage (CES). A system may include a refrigeration unit for cooling the CES to a second temperature range less than the first temperature range. A system may include a thermodynamic generator configured to provide electricity to the refrigeration unit based on a temperature difference between the HES and a heat sink. A system may include a load including one or more electrical devices and a load fluid circuit for cooling the load, wherein the load fluid circuit is in thermal communication with the CES.

16 Claims, 8 Drawing Sheets

(51) Int. Cl.

| | |
|---|---|
| ***F24S 60/30*** | (2018.01) |
| ***H02S 40/42*** | (2014.01) |
| ***H02S 40/44*** | (2014.01) |

(56) References Cited

U.S. PATENT DOCUMENTS

| | | | | |
|---|---|---|---|---|
| 2011/0314856 | A1* | 12/2011 | Willgohs | F25B 15/04 62/235.1 |
| 2012/0090663 | A1* | 4/2012 | Kiesewetter | H10F 77/488 136/248 |
| 2015/0143806 | A1* | 5/2015 | Friesth | F03G 7/04 220/592.2 |
| 2016/0079915 | A1* | 3/2016 | Intrieri | H02S 40/44 62/235.1 |
| 2016/0156309 | A1* | 6/2016 | Almogy | F24S 23/74 60/641.15 |

OTHER PUBLICATIONS

English machine translation of Choi (KR 101829862 B1) (Year: 2025).*

* cited by examiner

SYSTEM AND METHOD FOR COOLING A LOAD USING RENEWABLE ENERGY

CROSS-REFERENCE TO RELATED APPLICATIONS

The present application claims priority to and the benefit of U.S. Provisional Patent Application No. 63/613,185 entitled "SYSTEM AND METHOD FOR COOLING A LOAD USING RENEWABLE ENERGY" filed Dec. 21, 2023 and U.S. Provisional Patent Application No. 63/569,831 entitled "SYSTEM AND METHOD FOR COOLING A LOAD USING RENEWABLE ENERGY" filed Mar. 26, 2024, the disclosures of which are incorporated herein by reference in their entirety.

BACKGROUND

Some buildings or systems have high cold energy needs, for instance fisheries, supermarkets, datacenters, etc. The coolth is generally generated using a refrigeration unit powered by electricity from the electricity grid or by a battery storing electricity. Such a system can be expensive and have inefficiencies in either conversion of electrical energy to thermal energy and/or transfer of thermal energy (e.g., heat and coolth).

SUMMARY

In some aspects, the techniques described herein relate to a system including: a solar collector configured to receive sunlight, wherein the solar collector includes a solar thermal collector and a photovoltaic (PV) module; a hot energy storage (HES) configured to receive solar heat from the solar thermal collector and heat the HES to a first temperature range; a cold energy storage (CES); a refrigeration unit for cooling the CES to a second temperature range less than the first temperature range; a thermodynamic generator configured to provide electricity to the refrigeration unit based on a temperature difference between the HES and a heat sink; and a load including one or more electrical devices and a load fluid circuit for cooling the load, wherein the load fluid circuit is in thermal communication with the CES.

In some aspects, the techniques described herein relate to a system including: a solar collector configured to receive sunlight, wherein the solar collector includes a solar thermal collector and a photovoltaic (PV) module; a hot energy storage (HES) configured to receive solar heat from the solar thermal collector and heat the HES to a first temperature range; a cold energy storage (CES); a refrigeration unit for cooling the CES to a second temperature range less than the first temperature range; a thermodynamic generator configured to provide electricity to the refrigeration unit based on a temperature difference between the HES and a heat sink; a load including one or more electrical devices and a load fluid circuit for cooling the load, wherein the load fluid circuit is in thermal communication with the CES; and a valve configured to selectively direct return water from the load toward at least one of the HES and the CES.

In some aspects, the techniques described herein relate to a method of cooling a load including: receiving sunlight at least at a solar collector; transferring solar heat from the sunlight to a hot energy storage (HES) via the solar collector; providing solar electrical power from the solar collector to a refrigeration unit; cooling a cold energy storage (CES) using the refrigeration unit; cooling the load with the CES; and producing generator electrical power using a thermodynamic generator and heat from the HES.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and aspects of embodiments of the disclosure will be set forth in the description which follows, and in part will be obvious from the description, or may be learned by the practice of such embodiments. The features and aspects of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, non-schematic drawings should be considered as being to scale for some embodiments of the present disclosure, but not to scale for other embodiments contemplated herein. Understanding that the drawings depict some example embodiments, the embodiments will be described and explained with additional specificity and detail through the use of the accompanying drawings in which.

DETAILED DESCRIPTION

Figure 1:
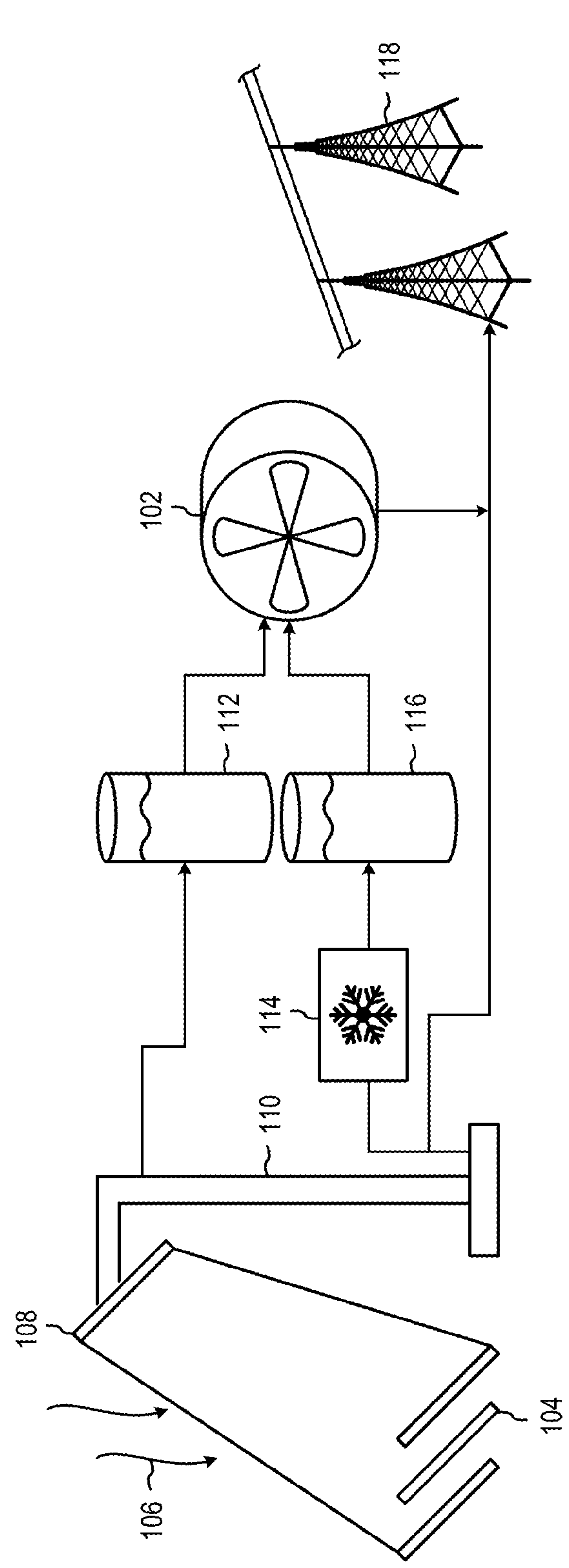
FIG. 1 illustrates a solar power generation system including a thermodynamic generator, according to at least some embodiments of the present disclosure.

The present disclosure relates generally to cooling a system using renewable energy with a decreased cost and/or improved efficiency. More particularly, the present disclosure relates to the generation, storage, and distribution of coolth through a fluid medium to one or more structures or systems that require cooling. In some embodiments, the heat transferred to the fluid medium during cooling of the structure or system is exhausted to ambient atmosphere. In some embodiments, the heat transferred to the fluid medium during cooling of the structure or system is harvested for storage and/or use in a thermodynamic generator.

In some embodiments, a power generation system according to the present disclosure includes a combination of solar energy capture and thermal energy storage that generates both heat and coolth to generate dispatchable energy any time of day and capable of storing energy for periods of up to weeks or months.

The solar system includes a solar collector that converts solar energy into solar electrical energy, such as via a photovoltaic (PV) module, and into solar thermal energy from infrared and UV-A/UV-B wavelength of the solar spectrum otherwise dissipated in conventional PV modules for later use in a thermal storage, for instance via using multijunction cells. The heat is, for instance, stored at or below 100 °C in a hot energy storage (HES). The electricity generated directly by the same solar collector may be used to run a compression refrigeration unit cycle, to store energy in chilled fluid or other cold energy storage (CES) at a high coefficient of performance, slightly above its freezing point. In some embodiments, the freezing point of the CES is approximately 0 °C. In some embodiments, the freezing point is above 0 °C. In some embodiments, such as a salt water CES, the freezing point is below 0 °C.

The available temperature differential between the HES and the CES can be used to evaporate and condense a working fluid, generating electricity in a thermodynamic generator via a thermodynamic cycle (such as a steam engine cycle, for instance an Organic Rankine Cycle (ORC) or Kalina Cycle), and/or the heat and/or coolth can be dispatched directly to a process that may benefit from the energy directly for heating and cooling loads.

The solar collector and thermal energy storage system may be coupled with a load that needs to be cooled (and possibly heated from time to time), such as a datacenter, a fishery, or a supermarket, or any other load with significant cooling needs. This enables a direct use of the coolth of the CES, maximizing its efficiency as this does not require to convert the energy into another form, such as into electrical energy.

Storing energy in a cheap media such as water, in a non-modular system allows for large amounts of energy to be stored or banked, with a diminishing cost of storage. Due to the non-linear relationship between the area and volume of a thermal energy storage system, a large system has a relatively small surface area to exchange heat with its surrounding environment, and a diminishing surface area to cover with insulation. As a result, efficiency improves with scale, and the costs of stored energy tends toward the material cost to supply water.

This makes the system suitable for storing cold energy in such a CES for days to weeks, allowing the thermal load (such as datacenters) operational flexibility and the ability to operate independent of power market pricing and/or direct use of intermittent renewable electricity generation (e.g., PV electricity generation, wind electricity generation) compared to operating refrigeration units as the load demand requires. Ambient water losses are <0.1% per day, and easily replaced by rainwater or condensation from ambient air.

In the following, reference is made to embodiments of the disclosure. It should be understood; however, that the disclosure is not limited to specific described embodiments. Instead, any combination of the following features and elements, whether related to descriptions of individual embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments. Similarly, any directional identifiers, such as top, bottom, front, back, etc., are used for relative references only for the exemplary descriptions herein. In some embodiments, a component described at a top, bottom, front, back, etc. may be located in other locations without substantially altering the function of the device or system unless otherwise noted to have a functional effect or purpose.

FIG. 1 illustrates such an example of a system 100 including a thermodynamic generator 102, such as an ORC generator. Such a system associates the ORC with a solar energy harvesting system. An example of such solar energy harvesting system is provided below. One or more mirrors 104 direct sunlight 106 onto a solar thermal collector, such as raised photovoltaic (PV) modules 108 supported by a PV module tower 110, that are actively cooled by water circulated through the PV module tower 110. The PV modules 108 convert the sunlight 106 to energy with approximately 90% efficiency, with about 30% of the sunlight energy converted to electricity by the PV modules 108 and about 60% converted to heat. The PV module may include a multijunction cell.

The heat is captured by a circulating water stream, and the heat is stored in a nearby water reservoir that is the hot energy storage (HES) 112 (first storage reservoir) or heat source for the thermodynamic generator 102 at a first temperature range. The thermodynamic generator 102 is configured to generate electricity from a temperature differential between the HES and a heat sink. In some examples, the heat sink is the ambient atmosphere. In some embodiments, the heat sink is a second fluid that is actively chilled. The HES may contain the water stream or another fluid heated using the water stream. The PV electricity (or the grid) is used to power a refrigeration system 114 to cool water in a second reservoir that is the cold energy storage (CES) 116 (second storage reservoir). In some examples, the CES and/or fluid pool thereby is the heat sink of the thermodynamic generator 102 at a second temperature range. Excess electricity produced by the thermodynamic generator 102 may be used to power a load, for instance sold to power local systems and/or sold to a power grid 118. In some embodiments, the two storage reservoirs, HES 112 and CES 116, may maintain a temperature difference of approximately 90 °C. This temperature difference is exemplary but other temperature differences may be maintained especially if the primary use of the CES 116 is not to power the thermodynamic generator 102 as a heat sink. Alternatively, ambient air may be used as the heat sink instead. Please note that the system 100 includes a thermodynamic generator 102, which could be or include any generator for generating electricity from a fluid cycle with a temperature differential between the HES and a heat sink, such as a steam engine, ORC generator, a Kalina cycle generator, etc.

Figure 2:
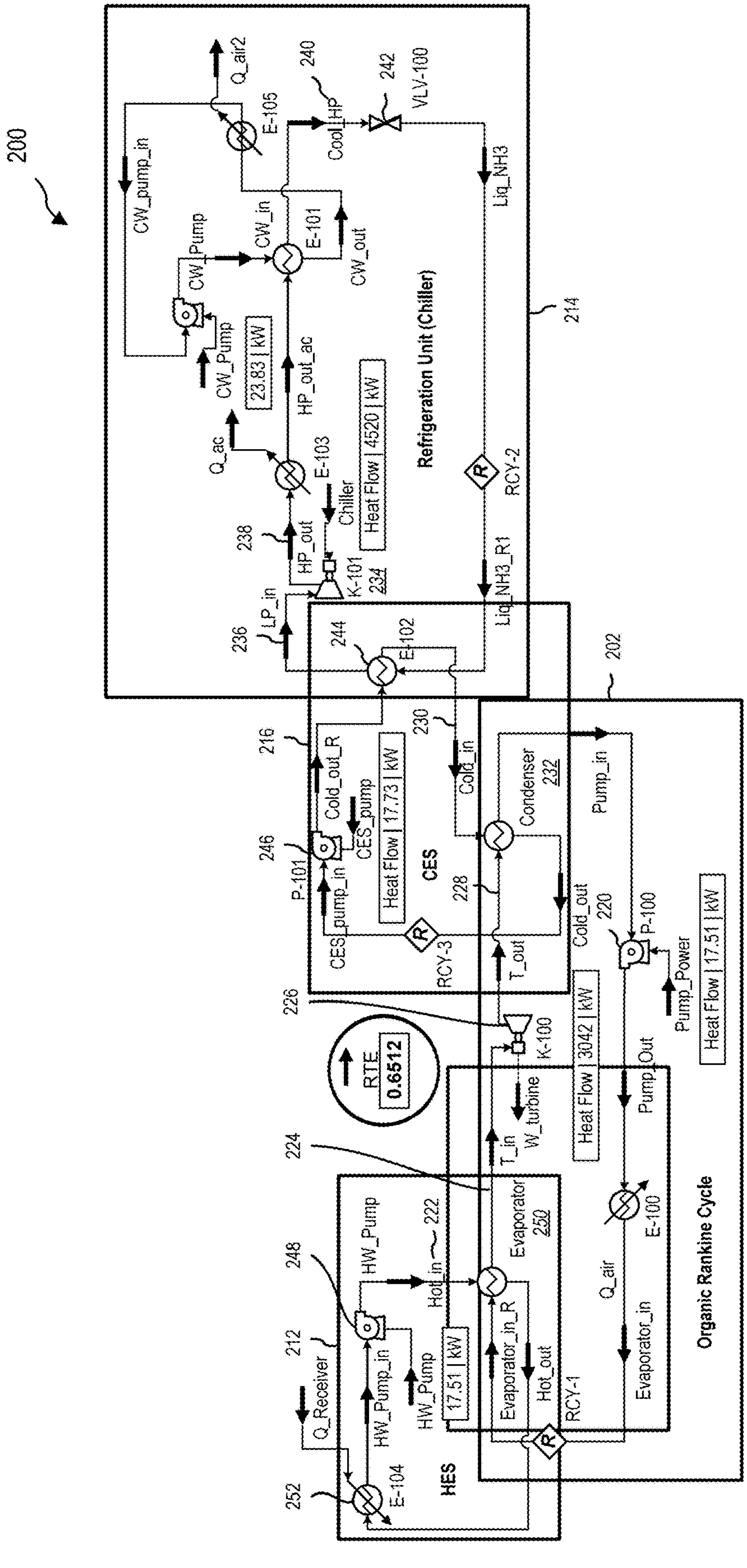
FIG. 2 illustrates a simulated solar power generation system, according to at least some embodiments of the present disclosure.

FIG. 2 is a simulation diagram for an energy storage aspect of another system 200 including an thermodynamic generator 202 (in this embodiment, an ORC generator). The ORC generator 202 is in thermal and hydraulic communication with an HES 212 and a CES 216 to provide the temperature differential to the ORC generator 202. FIG. 2 represents a steady state process, and in the simulation illustrated, the refrigeration provided by the refrigeration system 214 is matched to the condenser duty in the ORC generator 202. In some embodiments, a generator working fluid is ammonia. In the simulation, ammonia is used as both the generator working fluid and as a refrigeration fluid in the refrigeration system 214.

For the ORC generator 202, Pump P-100 220 increases the pressure of the generator working fluid (e.g., liquid ammonia) stream, which is the outlet stream labeled as Pump_out in FIG. 2. This outlet stream is first (and optionally) heated by ambient air (E-100) and then by a hot water stream (Hot_in) 222 from the HES 212. At this point, the turbine inlet T_in stream 224 is converted into a high-pressure vapor stream. The turbine inlet T_in stream 224 is expanded across expander K-100 226 to extract work. Turbine outlet T_out stream 228 is cooled and is condensed by cold water from the CES 216. The Cold_in inlet 230 delivers cold water to the condenser 232. This generator working fluid is condensed in the condenser 232 and forms the inlet stream to the Pump P-100 220 to complete the ORC. In other words, the evaporator and the condenser are heat exchangers that allow exchange of heat between the working fluid and respectively the hot and the cold fluid, respectively leading to evaporation and condensation of the working fluid.

Referring now to the refrigeration system 214, the compressor K-101 234 is used to compress a cool ammonia stream at the low-pressure LP_in inlet 236. The ammonia may be replaced by another refrigeration fluid. Also note that the ammonia stream is not in fluid communication with the working fluid.

In some embodiments, the hot high-pressure refrigeration fluid stream at the HP_out outlet 238 is cooled in an air-cooled heat exchanger E-103 and an optional water-cooled heat exchanger E-101 to create the refrigeration fluid stream Cool_HP 240. In some embodiments, the cooling water loop includes a pump CW_Pump and air-cooled heat exchanger E-105. The refrigeration fluid stream Cool_HP 240, at saturated conditions, is expanded across a thermo-expansion valve VLV-100 242 into the two-phase region on an ammonia phase diagram. This cold ammonia stream is used to cool the water stored in CES by exchanging heat in the heat exchanger E-102 244.

A cold water loop is shown in the CES 216 to allow cooling of the cold water via the refrigeration unit and condensation of the working fluid from the ORC generator. In some embodiments, the cold water loop includes a pump P-101 246 to offset the pressure drop in heat exchangers E-102 244 and the condenser 232. In some embodiments, the pump P-101 246 uses energy CES_Pump. As indicated above, in an embodiment, the cold water loop may be replaced by an ambient air circuit for condensing the working fluid.

A hot water loop is in the HES 212 to allow heating of the hot water via a heat exchanger 252 in thermal communication with the solar receiver, for instance in contact with a fluid circulating in the solar receiver, and evaporation of the working fluid from the ORC generator. In some embodiments, the hot water loop comprises a pump HW_Pump 248 to offset the pressure drop in heat exchanger Evaporator 250 and heat exchanger E-104 252.

Figure 3:
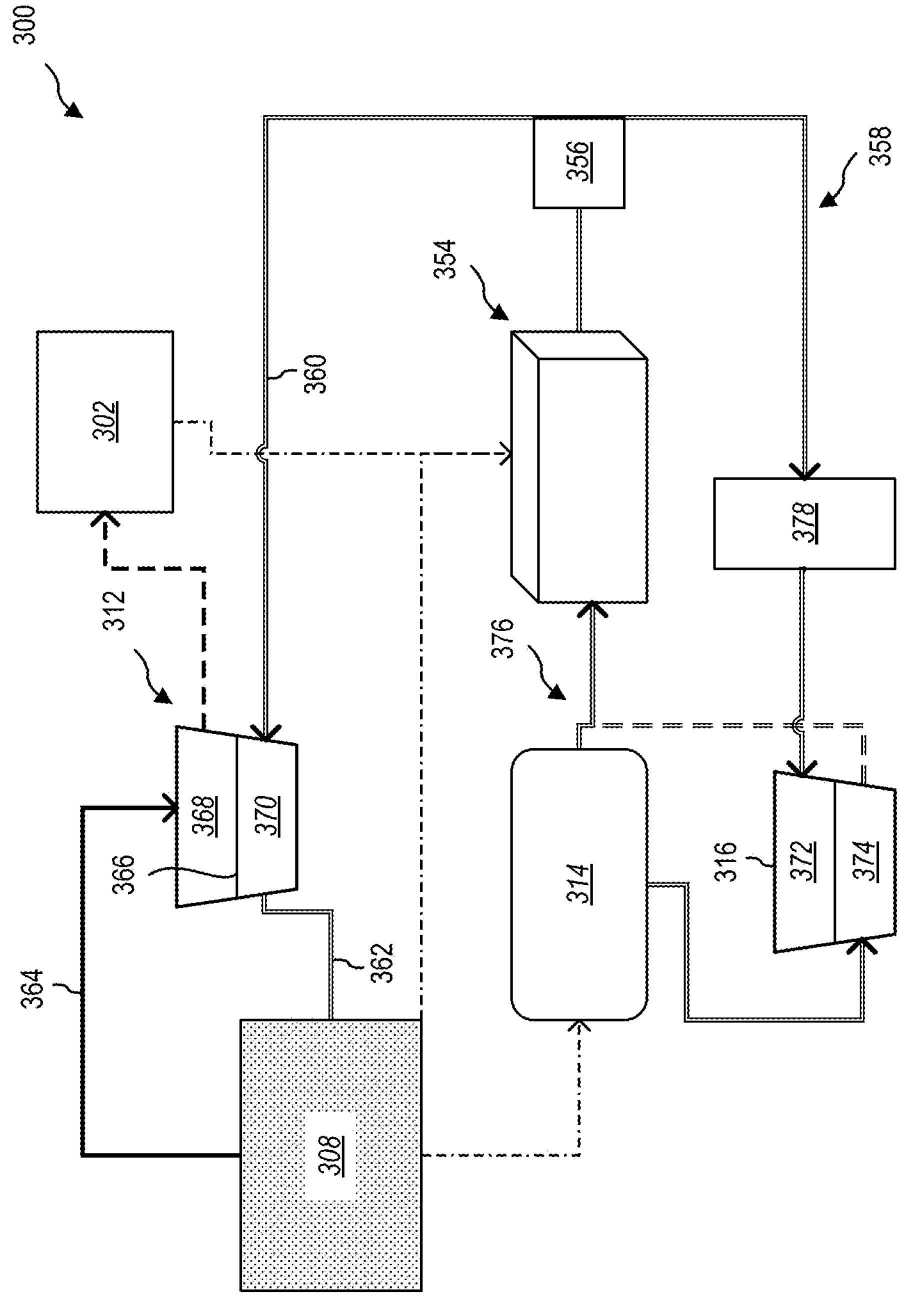
FIG. 3 illustrates a solar power generation system for cooling a thermal load, according to at least some embodiments of the present disclosure.

FIG. 3 shows a schematic diagram of a system coupling a solar energy harvesting system as described above with a load requiring (mainly) cold, such as fisheries, datacenter. The solar energy generation system 300 is, in some embodiments, similar to that described in relation to FIG. 1, and is illustrated on the left-hand side of FIG. 3. On the right-hand side of FIG. 3 is a load, such as a datacenter 354. In some embodiments, the load is a thermal load. In some embodiments, the load is a thermal and electrical load. The load generally includes devices requiring power, such as servers in the datacenter 354. It also may include a fluid circuit (not shown) to handle the temperature within the load. The fluid circuit, in some embodiments, circulates a load fluid in the load to cool the load appropriately. The load fluid may be air or a liquid such as water and the load fluid circuit may deliver the fluid to the whole building or only to part of the building that have specific thermal requirements. In an embodiment where the load is a datacenter, the load fluid may be a dielectric fluid in which the servers are immersed. In another embodiment where the load is a datacenter, the load fluid is air, and the building fluid circuit is set up so that the air circulates between the server racks and/or the servers. In some embodiments, the load fluid circulates to and/or through an air handling unit (AHU) of the load to transfer heat between the air of the load structure and the load fluid.

Cold water 376 (generally at 0-25 °C) can be supplied to the datacenter 354 to provide cooling needs directly or indirectly (e.g., in the load fluid circuit or to cool the load fluid in the load fluid circuit via a heat exchanger). The cold water may be supplied directly from the refrigeration unit and/or from the cold pit. The return water from the datacenter (that may approximately be at a temperature of 25 °C) can either be returned to the HES 312 or cooled with ambient air (for instance in an optional cooling tower 378), depending of the ambient air temperature and dew point, and returned to the CES 316 (water returned after cooling being for instance at a temperature a few degrees higher than dew point). Evaporative cooling may be used if water availability is not an issue. In some embodiments, a valve 356 directs a portion or all of the return water toward to a cool return water line 358 or toward a warm return water line 360 based at least partially on a temperature of the return water. In some embodiments, a valve 356 directs a portion or all of the return water toward a cool return water line 358 or toward a warm return water line 360 based at least partially on an ambient atmospheric temperature. In some embodiments, the valve 356 directs a portion or all of the return water toward a cool return water line 358 or toward a warm return water line 360 based at least partially on a temperature difference between the return water and the ambient atmospheric temperature.

In some embodiments, a controller is in data communication with a valve 356 or other device for directing flow of the return water from the datacenter 354 or other thermal load. In some embodiments, the controller may be integrated with and/or part of the thermal load (e.g., in the illustrated embodiment, the datacenter 354). In some embodiments, the controller is independent of the thermal load. For example, the controller may be integrated with the valve 356.

In some embodiments, the controller determines a direction of the return and/or a proportion of the return water based at least partially on a return water temperature. For example, the controller may receive a temperature measurement of the return water temperature and compare the return water temperature to a threshold value. In some embodiments, return water with a return water temperature greater than the threshold value is directed to a warm return water line 360 and toward the HES 312. In some embodiments, return water with a return water temperature less than the threshold value is directed to a cool return water line 358 and toward the CES 316. The threshold value may be the ambient temperature. In another embodiment, the valve 356 may be downstream of the optional cooling tower 378.

In some embodiments, the warm return water may be cooler than the hot water of the HES 312, and the cooler water in the HES 312 and/or from the warm return line 360 is recirculated to the PV module(s) 308 through a PV water return line 362. In some embodiments, after receiving heat from the PV module(s) 308, the water (or other fluid) returns to the HES 312 through a PV water supply line 364.

The HES 312 including a fluid thermal mass, in some embodiments, has a thermocline 366 in the fluid thermal mass that marks a relatively abrupt transition between a hot region 368 and a warm region 370 that are in direct contact with one another and share a fluid across the thermocline. The hot region 368 of the fluid thermal mass has a higher temperature than the warm region 370 of the fluid thermal mass. In some embodiments, warm return water from the warm return water line 360 is supplied to the warm region 370 through a port or other ingress into the HES 312 below the hot region 368. For example, the port or other ingress for the warm return water may introduce the warm return water in a laminar flow to limit and/or prevent turbulence and mixing of the fluid thermal mass across the thermocline 366.

In some embodiments, hot water from the PV water supply line 364 enters at the hot region 368 of the HES 312 (e.g., fluid pit or tank) above the warm region 370 through a port or other ingress above the thermocline 366. For example, the port or other ingress for the hot water from the PV water supply line 364 may introduce the hot water in a laminar flow to limit and/or prevent turbulence and mixing of the fluid thermal mass across the thermocline 366.

In some embodiments, the PV water return line 362 extracts warm water from the warm region 370 of the HES 312. For example, the PV water return line 362 may extract warm water (or other fluid) from the warm region 370 of the HES 312 in a laminar flow to limit and/or prevent turbulence and mixing of the fluid thermal mass across the thermocline 366. The PV water return line 362 provides the warm water to the PV modules 308 or other portion of the solar collector to receive the thermal energy from the sunlight. The heated water from the solar collector is then provide to the HES 312 from the PV water supply line 364. In some embodiments, at least a portion of the hot region 368 of the HES 312 and at least a portion of the warm region 370 of the HES 312 has a temperature difference of greater than 30 °C. In some embodiments, at least a portion of the hot region 368 of the HES 312 and at least a portion of the warm region 370 of the HES 312 has a temperature difference of greater than 45 °C. In some embodiments, at least a portion of the hot region 368 of the HES 312 and at least a portion of the warm region 370 of the HES 312 has a temperature difference of greater than 60 °C. In at least one example, the warm region 370 has a warm temperature range including approximately 25 °C (e.g., 25 °C to 90 °C) and the hot region has a hot temperature range including approximately 90 °C or higher.

In some embodiments, hot water from the hot region 368 is extracted to the thermodynamic generator 302. In some embodiments, hot water is extracted from the hot region 368 of the HES 312 (e.g., fluid pit or tank) above the warm region 370 through a port or other egress above the thermocline 366. For example, the port or other egress for the hot water may extract the hot water in a laminar flow to limit and/or prevent turbulence and mixing of the fluid thermal mass across the thermocline 366. The heat from the hot water is used in a thermodynamic cycle of the thermodynamic generator 302 to generate electricity.

The electric power produced by the photovoltaic panels may be used to operate the refrigeration unit 314 that charges the CES 316, as previously explained in relation with FIG. 1, and/or to supply electrical power to the datacenter 354. In some embodiments, when the CES temperature is outside of a target temperature range, the refrigeration unit operates to lower the CES temperature to the target temperature range. For example, the PV modules provide electrical power to the refrigeration unit 314 when solar electrical power is available, and the refrigeration unit 314 charges the CES 316 to the target temperature range. When the CES 316 is within the target temperature range, the refrigeration unit 314 does not operate and/or operates at a lower power consumption to maintain the target temperature range. In some embodiments, the CES temperature and the target temperature range are measured as an average temperature of a fluid or other thermal mass in the CES 316. In some embodiments, the CES temperature and the target temperature range are measured a CES charge level of the CES 316 defined at least by a proportion of cold fluid relative to a warmer fluid (i.e., across a thermocline, as is described herein). For example, a CES charge level with 50% of the CES being cold fluid and 50% of the CES being a warmer fluid is a lower CES charge level than 80% of the CES being cold fluid and 20% of the CES being a warmer fluid. In such an example, the average temperature of the fluid would be greater for the lower CES charge level.

When solar energy is not available and electrical power is required, heat from the HES 312 may be used to generate power using a thermodynamic cycle generator 302, such as an ORC generator. In this embodiment, a second fluid, such as ambient air, may be used in the generator cycle. Alternatively, the second fluid may be a cold fluid from the CES 316. This electrical power may be used to meet the datacenter needs or for operating the refrigeration unit 314, especially at times when the solar power is not available.

In some embodiments, the CES 316 includes a thermocline similar to that of the HES 312; above which a cool region 372 includes a cool water or other fluid thermal mass, and below which a cold region 374 includes a cold water or other fluid thermal mass that are in direct contact with one another and share a fluid across the thermocline. In some embodiment, the cold region 374 is in a cold temperature range at or near a freezing temperature of the fluid thermal mass (such as being 0 °C to 10 °C of a water-based CES 316 or less for a saltwater-based CES 316). In some embodiments, the cool region 372 is in a cool temperature range that is warmer than the cold region 374 (such as being 10 °C to 25 °C).

A cold water supply line 376, in some embodiments, provides cold water from the refrigeration unit 314 to the cold region 374 of the CES 316. In some embodiments, the cold water supply line 376 provides the cold water to the cold region 374 through a port or other ingress to the CES 316 in a laminar flow to limit and/or prevent turbulence and mixing of the fluid thermal mass in the CES 316. In some embodiments, the cold water supply line 376 selectively and/or partially provides the cold water directly to the thermal load (e.g., the datacenter 354) to cool the thermal load.

In some embodiments, a cool return water line 358 provides return water from the thermal load toward the cool region 372 of the CES 316 through a port or other ingress to the CES 316 in a laminar flow to limit and/or prevent turbulence and mixing of the fluid thermal mass in the CES 316. In some embodiments, the cool return water line 358 provides return water from the thermal load to a cooling tower 378 or other intermediate cooling device to lower a temperature of the return water before the return water is added to the CES 316. For example, the cooling tower 378 may cool the return water before the cooled return water is added to the cool region 372 of the CES 316. In some examples, the cooling tower 378 may cool the return water before the cooled return water is added to the cold region 374 of the CES 316.

In some embodiments, the cooling tower 378 or other cooling device lowers the temperature of the return water by passive cooling. For example, the cooling tower 378 may cool the return water through passive exhaustion of heat from the return water to the ambient atmosphere. In some embodiments, the controller in communication with the valve 356 directing the return water from the datacenter 354 or other thermal load, directs the return water to the cooling tower 378 based at least partially on the ambient atmospheric temperature.

In some embodiments, the cooling tower 378 or other cooling device lowers the temperature of the return water by evaporative cooling. For example, the cooling tower 378 may cool the return water through exhaustion of heat from the return water to a secondary fluid that is evaporated from the cooling tower 378. The evaporation of the secondary fluid exhausts heat through the latent heat of boiling. Evaporative cooling capacity, however, may be limited by the ambient temperature, air pressure, and/or humidity. In some embodiments, the controller in communication with the valve 356 directing the return water from the datacenter 354 or other thermal load, directs the return water to the cooling tower 378 for evaporative cooling based at least partially on the ambient atmospheric temperature. In some embodiments, the controller in communication with the valve 356 directing the return water from the datacenter 354 or other thermal load, directs the return water to the cooling tower 378 for evaporative cooling based at least partially on the ambient atmospheric humidity. In some embodiments, the controller in communication with the valve 356 directing the return water from the datacenter 354 or other thermal load, directs the return water to the cooling tower 378 for evaporative cooling based at least partially on the dew point. In some embodiments, the controller in communication with the valve 356 directing the return water from the datacenter 354 or other thermal load, directs the return water to the cooling tower 378 for evaporative cooling based at least partially on a wet-bulb temperature.

In a particular simulation for a 100 MW datacenter, the total heat that needs to be rejected may be approximately 2400 Megawatt-hours of thermal energy (MWhth). Assuming an ambient temperature of 20 °C, and a refrigeration unit COP of 5, this converts to 480 Megawatt-hours of electrical energy (MWhe). A field of 75 solar collectors with PV modules 308, in a ~500-acre footprint, can provide this solar electrical power during the day. Simultaneously, the HES 312 is charged with approximately 1000 MWhth. An additional 75 MWhe can be supplied from a generator to the datacenter to subsidize its power needs or for any pump power or air blower requirements. The datacenter power usage effectiveness (PUE) is then close to 1.0 or slightly less than 1.0.

As will be described herein, at night or other conditions when the electricity and heat available through the solar field are insignificant, the thermodynamic generator 302, in some embodiments, produces electricity using the heat from the HES 312, and this electricity is used to power the load by providing electricity to the load, and/or the refrigeration unit 314. Additional electricity may be used from batteries and/or from the grid to power the refrigeration unit and/or the load as described at least in relation to FIG. 4 through FIG. 7.

Figure 4:
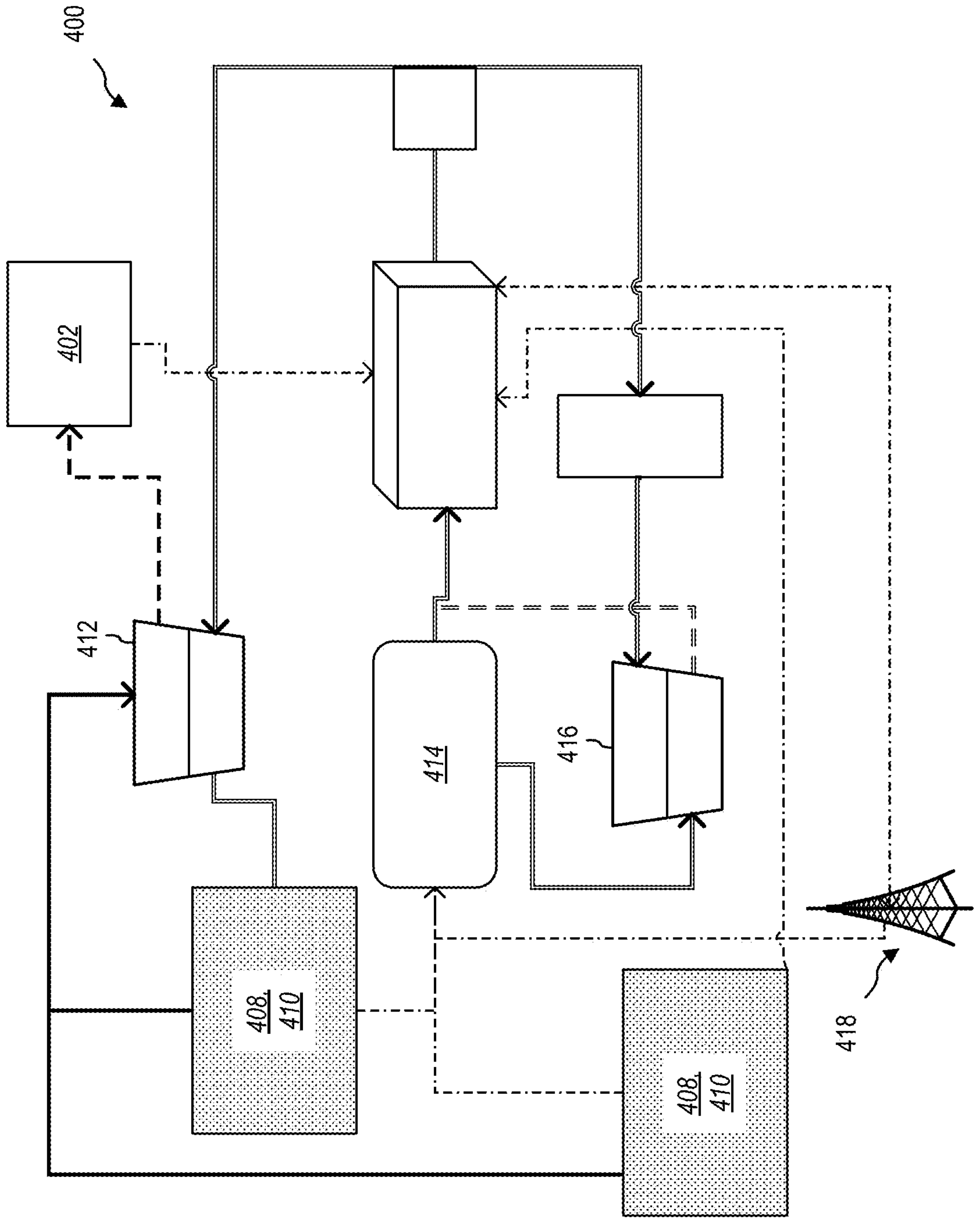
FIG. 4 illustrates a solar power generation system connected to a regional power grid for cooling a thermal load, according to at least some embodiments of the present disclosure.

In another embodiment shown on FIG. 4, the system 400 is connected to the electrical grid 418. In such a case, when the electricity cost from the grid 418 is low or negative (i.e., negative power price), the refrigeration unit 414 can use this low/no cost electricity to add coolth to the CES 416. In some embodiments, the CES 416 is used to provide coolth to the datacenter at any time of day and/or night. As described in relation to FIG. 3, after receiving heat from the thermal load (e.g., datacenter 454), the return water is selectively directed by a valve 456 toward the HES 412 and/or CES 416. Additionally, when operating the thermodynamic generator 402 (e.g., an ORC generator), surplus electrical power may be exported to the grid 418 at times when the power prices are high.

In some embodiments, such as when an excess of cold water (or other cold fluid) is available in the CES 416, the thermodynamic generator 402 is operated using the temperature difference between the HES 412 and the CES 416 for improved efficiency and higher power output relative to the temperature difference between the HES 412 and ambient atmosphere.

In the above-described simulation of an embodiment of a system described at least in relation to FIG. 3, a simulated field of 75 solar collectors (e.g., PV Modules 408 and towers 410) can provide the cooling needs of a 100 MWe datacenter. The daily electric needs of the simulated datacenter are 2400 MWhe. In another simulation example, an additional 160 solar collectors can generate 100 MWe for six hours during the middle of the day (i.e., 600 MWhe) that may be used for datacenter needs. An additional 450 MWe of solar electrical power from the PV modules is available in the morning and evening hours that may be used to subsidize the grid power intake. The simulated towers generate a hot water charge of 2300 MWhth in the HES 412. This can be used to generate an additional 162 MWhe for meeting the datacenter's needs. In summary, half of the datacenter's total electrical power requirements and the total cooling requirements may be met with two fields of 75 and 160 towers in such a simulation. The regional power grid 418 may provide power to the datacenter for the remaining hours. Based on grid power import, the datacenter PUE is then close to 0.5. The simulation is an example but the size of the CES and number of containers may be optimized in order to have a capacity to cover 100% of the needs of the data center.

Figure 5:
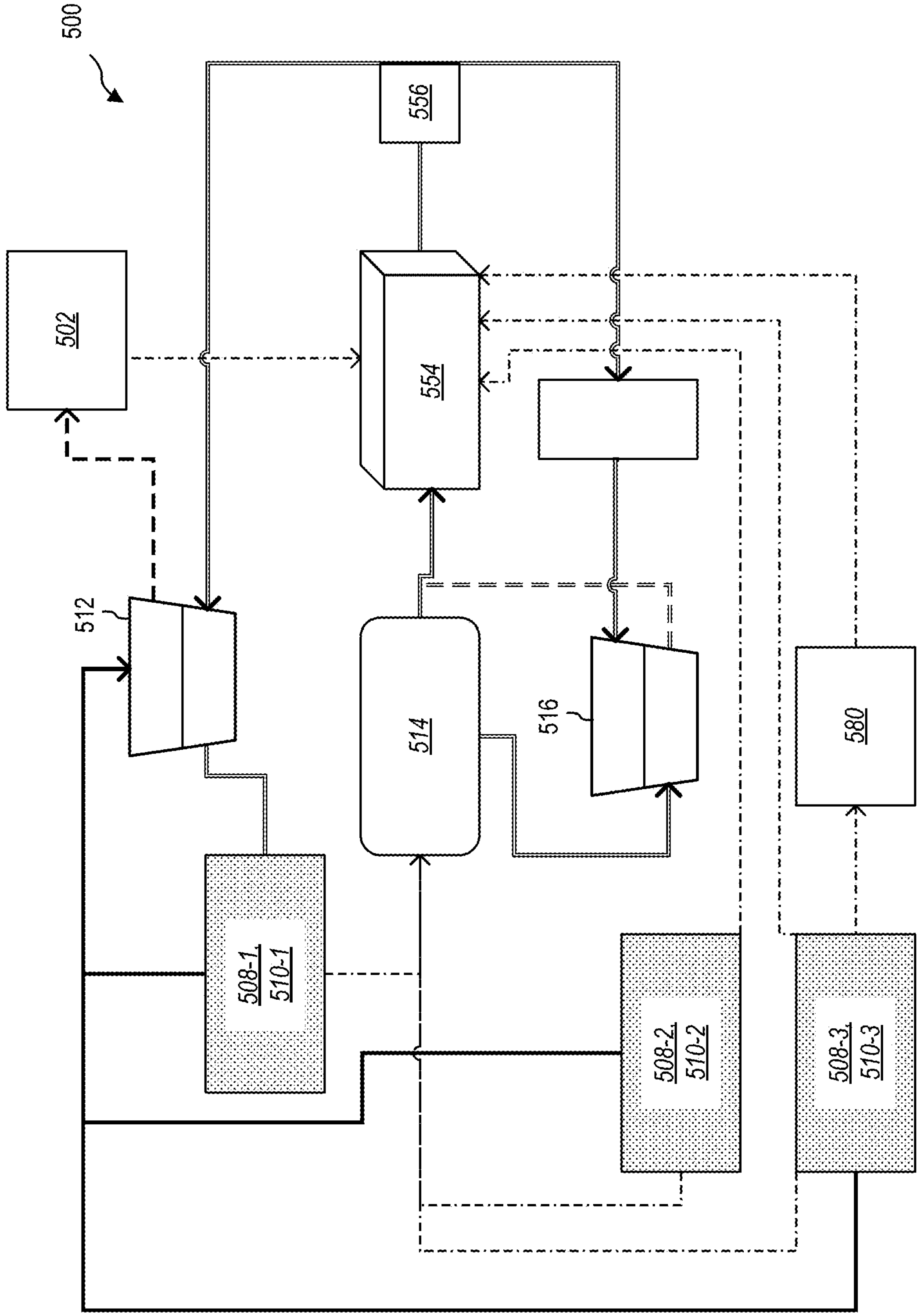
FIG. 5 illustrates a solar power generation system that is off-grid for cooling a thermal load, according to at least some embodiments of the present disclosure.
Figure 6:
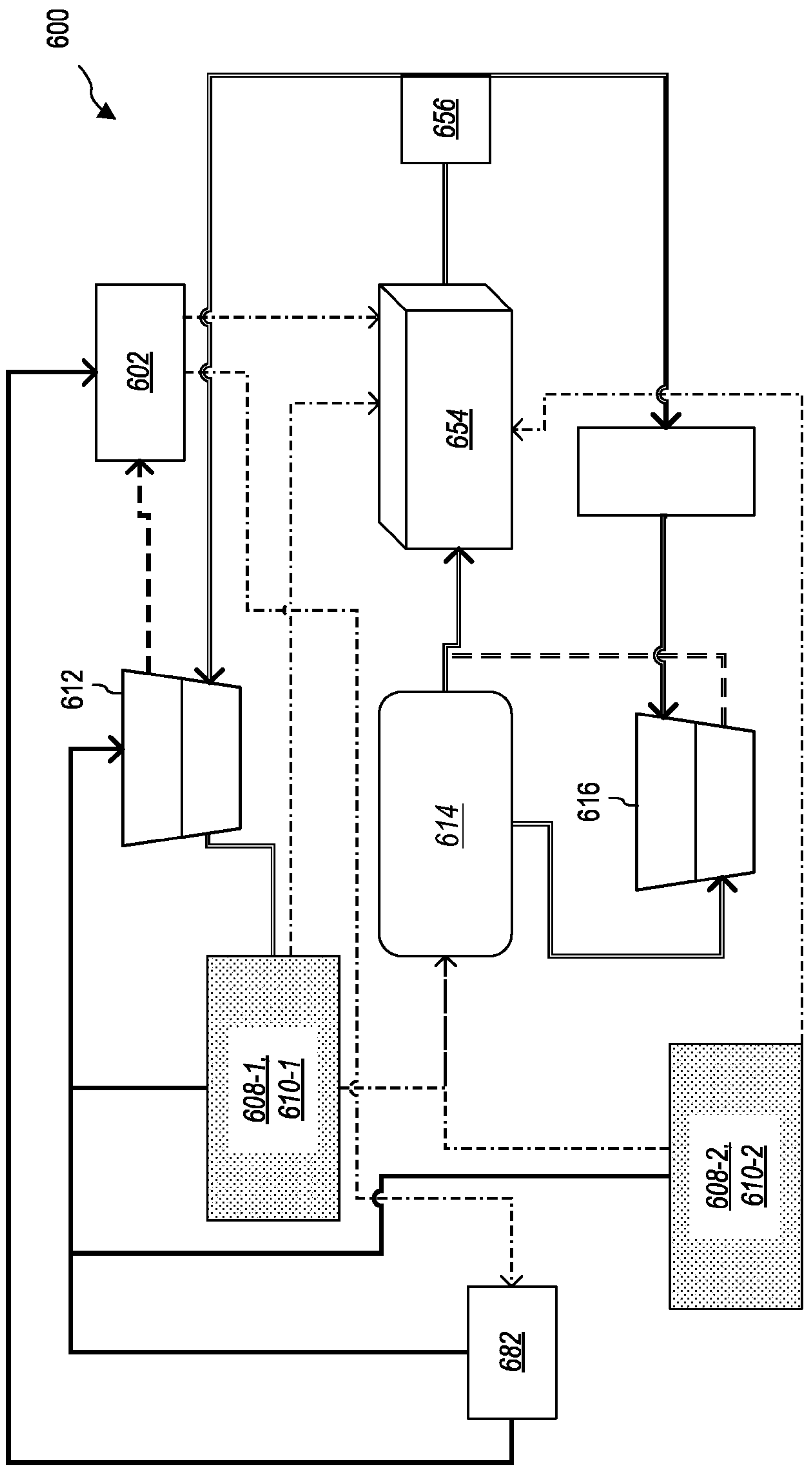
FIG. 6 illustrates a solar power generation system including a geothermal heat source for cooling a thermal load, according to at least some embodiments of the present disclosure.
Figure 7:
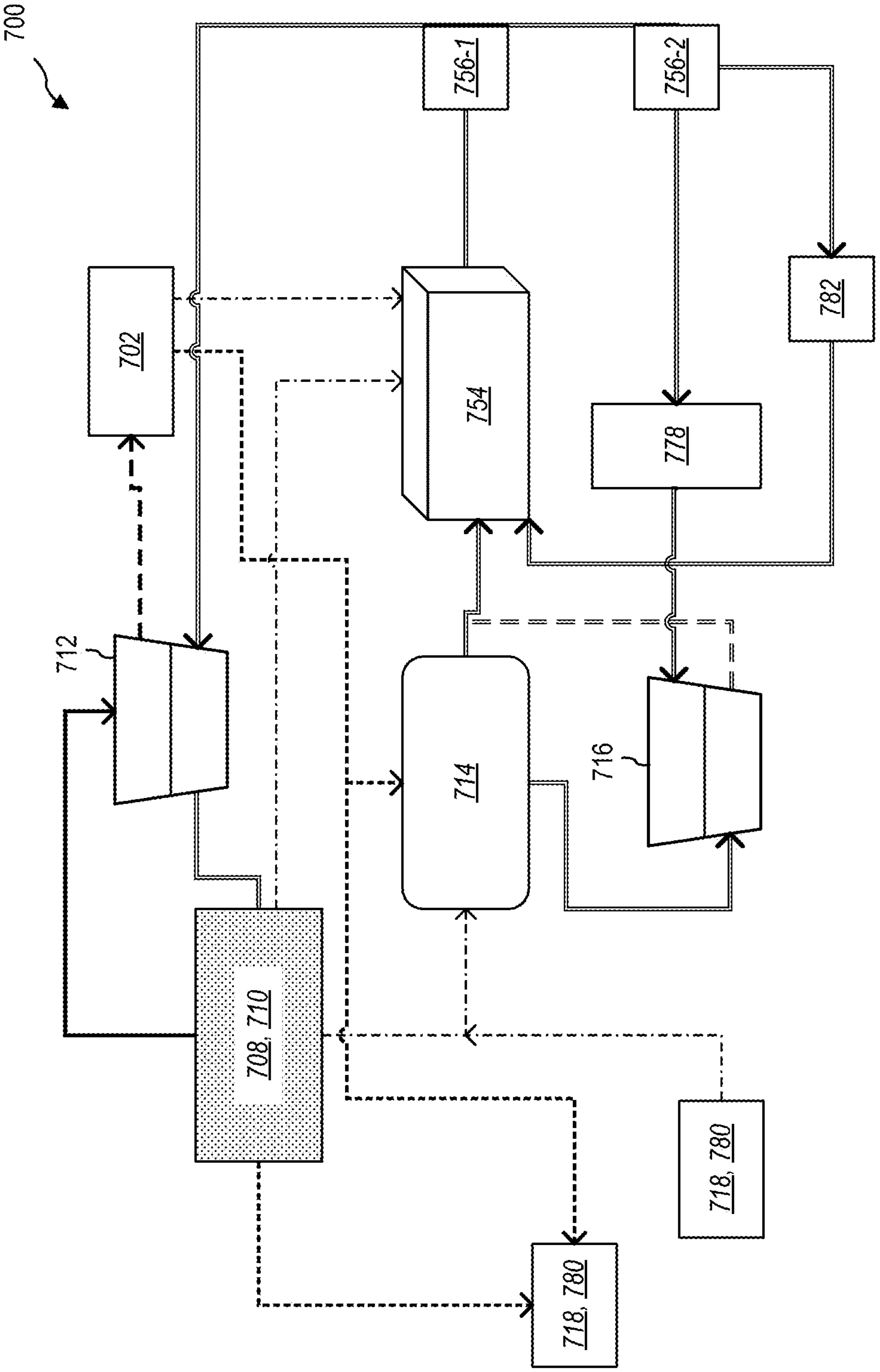
FIG. 7 illustrates a solar power generation system including ground source cooling for cooling a thermal load, according to at least some embodiments of the present disclosure.

Referring now to the FIGS. 5-7, additional embodiments and features thereof are described. Such embodiments describe completely off-grid solutions, that can autonomously cool and power the datacenter, without any connection to a regional power grid. While off-grid embodiments are described herein, it should be understood that any off-grid embodiment may be connected to a grid for additional reliability and redundancy in power supply and/or for exportation of surplus energy from the system to the regional power grid.

In some off-grid embodiments, additional solar collectors are used beyond those described in relation to FIG. 3 and FIG. 4. In some embodiments, the system 500 includes an additional electrical energy storage mechanism, such as batteries 580, for storing electrical energy. In some embodiments, other additional electrical energy storage mechanisms are used, such as pumped hydro storage, compressed air energy storage (CAES), or liquid air energy storage (LAES). The electrical energy storage mechanisms may be charged with energy from any of the PV modules 508-1, 508-2, 508-3, and/or the thermodynamic generator 502.

In some embodiments, one or more PV modules are dedicated to providing power to the datacenter directly during solar generation hours (e.g., daytime). During this time, solar thermal energy is captured and stored in the HES. In some embodiments, the thermodynamic generator uses the HES as a heat source and the CES as a heat sink to produce generator electrical power during day. In some embodiments, the thermodynamic generator uses the HES as a heat source and the ambient atmosphere as a heat sink to produce generator electrical power during day. In some embodiments, the stored thermal energy may be used to generate power during times when solar generation is not possible (such as at night) by operating the thermodynamic generator and using the ambient temperature as a heat sink. In some embodiments, the coolth of the CES may be used to cool the thermal load when solar generation is not possible.

In some embodiments, one or more PV modules (e.g., PV modules 508-3) are dedicated to the electrical energy storage mechanism, such as batteries 580, for storing electrical energy for use at night, in adverse weather, or in periods of high electrical demand from the load (e.g., the datacenter 554). In some embodiments, the solar collectors include solar thermal collectors (e.g., towers 510-1, 510-2, 510-3) that provide solar thermal energy (e.g., hot water) to the HES 512 despite the PV electrical power being directed to the batteries 580. In some embodiments, the solar collectors selectively provide electrical energy to any of the thermodynamic generator 502, electrical energy storage devices (batteries 580, CAES, LAES) or loads (e.g., datacenter 554), as needed, and/or thermal energy to the HES 512. In some embodiments, the additional electrical energy storage devices provide power to the load (e.g., the datacenter 554). In some embodiments, the additional electrical energy storage devices provide power to the refrigeration unit 514, which provides coolth to the CES 516 and to the thermal load (e.g., the datacenter 554). As described in relation to FIG. 3, after receiving heat from the thermal load, the return water may be returned to the HES 512 and/or CES 516, for instance selectively directed by a valve 556 toward the HES 512 and/or CES 516.

In some embodiments, such as illustrated in FIG. 6, the electrical energy storage mechanism may be replaced/complemented by additional thermal energy sources and/or storage such as a geothermal source 682. In some embodiments, a geothermal source 682 provides additional heat to the thermodynamic generator 602 when the solar collectors (e.g., PV modules 608-1, 608-2 and towers 610-1, 610-2) are not providing heat, for instance at night, to the HES 612 and the thermodynamic generator 602. In some embodiments, a geothermal source 682 can supplement the heat in the HES 612, further allowing the thermodynamic generator 602 to generate generator electrical power to operate the refrigeration unit 614 and cool the CES 616 while maintaining a sufficient temperature of the HES 612. For example, the thermodynamic generator 602 may generate electricity during night while the temperature of the HES 612 remains in a steady-state. In some examples, the geothermal source 682 allows the HES 612 to maintain temperature (e.g., remain at the same temperature) overnight even while heat is lost to the ambient atmosphere or to the ambient ground around the HES 612. In some embodiments, a geothermal source 682 can supplement the heat in the HES 612, further allowing the thermodynamic generator 602 to generate generator electrical power to operate the refrigeration unit 614 and cool the thermal load. As described in relation to FIG. 3, after receiving heat from the thermal load, the return water is selectively directed by a valve 656 toward the HES 612 and/or CES 616. In some embodiments, additional passive sources of heat to the HES 612 may increase the efficiency of the system 600.

In some embodiments, additional cooling of the return water further increases the efficiency of the system. Referring now to FIG. 7, some embodiments of a system 700 include ground source cooling to passively exhaust heat from the return water directed toward the CES 716. As described in relation to FIG. 3, after receiving heat from the thermal load, the return water is selectively directed by a first valve 756-1 toward the HES 712 and/or CES 716. In some embodiments, directing the return water toward the CES 716 directs the return water toward a ground source well 782. In some embodiments, a second valve 756-2 selectively directs the cool return water toward a cooling tower 778 and/or a ground source well 782. A ground source well 782 is, in some embodiments, a shallow geothermal well to allow thermal transfer between the ground and the return water. In some embodiments, a ground source well 782 includes one or more shallow wellbores, for instance an array of shallow wellbores. The ground source well 782 may be used to cool the cool return water line from the thermal load (via the first valve 756-1) by exchanging heat with the subsurface formation. In some examples, a plurality of ground source wells 782 are rotated to allow heat introduced to the subsurface formation to dissipate. For example, the return water may exchange heat in a first ground source well 782 for a predetermined period of time (e.g., six months), after which the return water may be directed to a second ground source well for a second predetermined period of time (e.g., six months) to allow the heat introduced the first ground source well 782 to dissipate. After the second predetermined period of time, the return water may be directed toward the first ground source well 782 again or toward yet another ground source well.

While FIG. 7 illustrates an embodiment of a system 700 with a cooling tower 778 and a ground source cooling well 782 is parallel (i.e., as alternatives for the return water based on the state of the second valve 756-2), it should be understood that, in some embodiments, the cooling tower 778 and a ground source well 782 are in series with the same return water flowing through both the cooling tower 778 and the ground source well 782. In some examples, the return water flows through the cooling tower 778 first and the ground source well 782 second. In some examples, the return water flows through the cooling tower 778 second and the ground source well 782 first. In some embodiments, the first valve 756-1 and/or the second valve 756-2 is controlled by a controller that directs the return water based at least partially on the subsurface formation and/or ground source temperature. In some examples, and as described in relation to FIG. 3, the controller may control the first valve 756-1 and/or the second valve 756-2 based at least partially on the ambient atmospheric temperature. In some examples, the controller may control the first valve 756-1 and/or the second valve 756-2 based at least partially on the subsurface formation and/or ground source temperature to direct return water toward the CES 716 when the subsurface formation and/or ground source temperature is below a threshold value. In some examples, the controller may control the first valve 756-1 and/or the second valve 756-2 based at least partially on a temperature difference between the subsurface formation and/or ground source temperature and the return water temperature to direct return water toward the CES 716.

Figure 8:
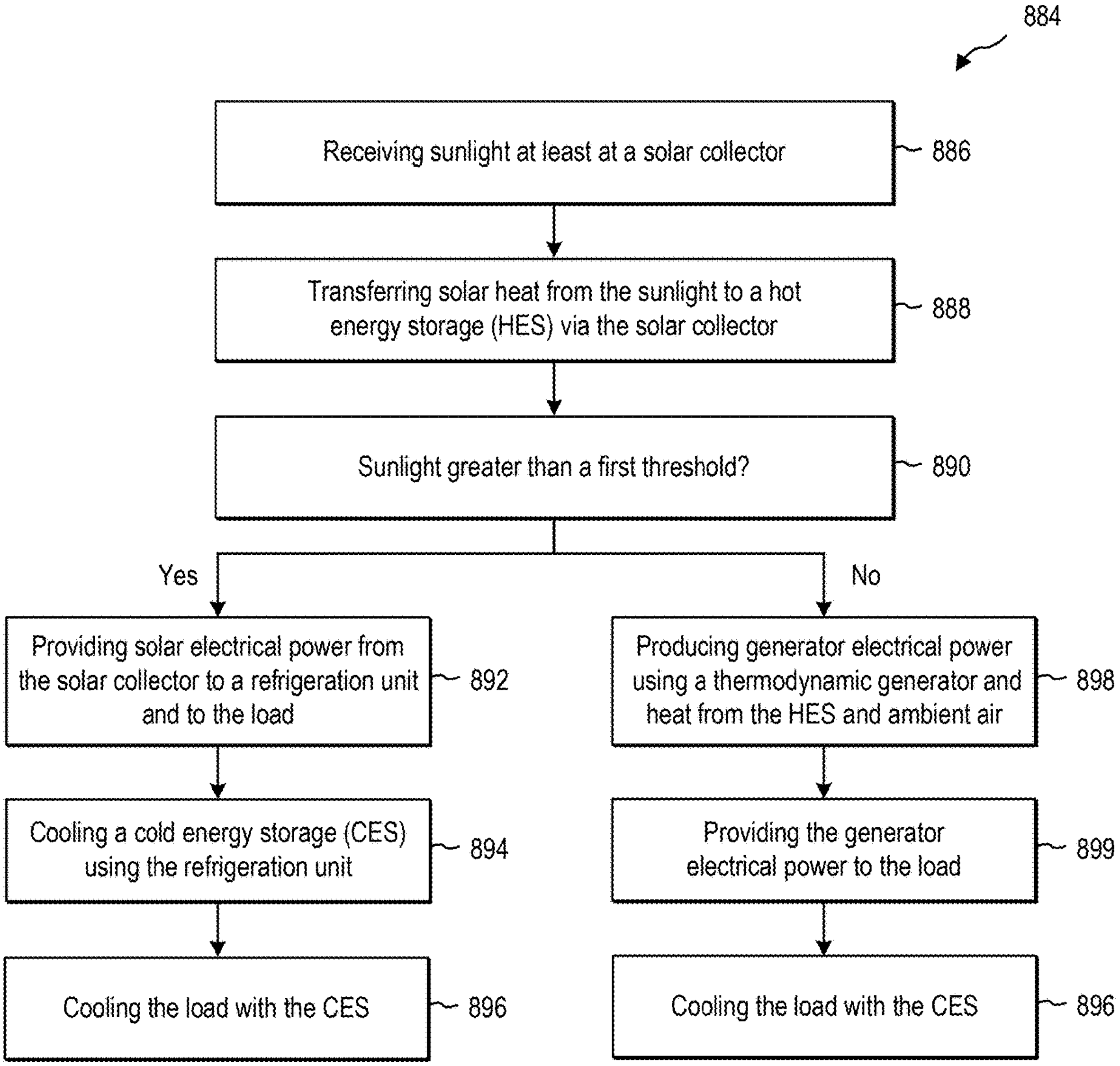
FIG. 8 is a flowchart illustrating a method of providing power and cooling to a load, according to at least some embodiments of the present disclosure.

FIG. 8 is a flowchart illustrating an embodiment of a method 884 of providing power and cooling to a load. In some embodiments, the method 884 includes receiving sunlight at least at a solar collector, such as a solar collector described herein, at 886 and transferring solar heat from the sunlight to an HES via the solar collector at 888. In some embodiments, the method 884 includes comparing the sunlight to a first threshold and determining whether the quantity and/or intensity of the sunlight is greater than the first threshold at 890.

In some embodiments, comparing the sunlight to a first threshold includes measuring at least one of a variety of properties of the sunlight and/or a product of the solar collector from the sunlight. For example, the first threshold may be a threshold value of a brightness of the available sunlight incident on the solar collector. In another example, the first threshold may be a threshold value of a fluence of the sunlight incident on a surface of the solar collector. In yet another example, the first threshold may be a threshold value of a solar electrical power produced by a PV module of the solar collector. In at least one example, cloud cover or other atmospheric conditions can affect the spectrum of the sunlight incident on the solar collector, changing the amount of electrical power produced even when the brightness of the sunlight remains the same. In a further example, the first threshold may be a threshold value of a solar heat received by a fluid of the solar collector.

Based at least partially on the amount of sunlight being greater than the first threshold, the method 884 includes providing solar electrical power from the solar collector (e.g., via a PV module of the solar collector) to a refrigeration unit and to a load at 892. In some embodiments, the solar electrical power provided to the refrigeration unit allows the method 884 to include cooling a CES using the refrigeration unit at 894. In some embodiments, the method 884 further includes cooling the load with the CES at 896, as described herein such as by use of a load fluid loop.

Based at least partially on the amount of sunlight being not greater than the first threshold, the method 884 includes providing the solar electrical power from the solar collector to the load only, producing generator electrical power using a thermodynamic generator using the HES and ambient air (e.g., via a PV module of the solar collector) at 898. The method 884 further includes providing the generator electrical power to the load at 899. When the amount of sunlight being not greater than the first threshold, the refrigeration unit is not powered. The CES is sufficient to store the coolth needed for the cooling of the load during the periods where the sunlight is limited (i.e., night for instance). Therefore, the system does not need any additional element to provide energy for cooling.

In some embodiments, any solar electrical power generated, even below a threshold value, may be provided to the load to supplement the generator electrical power. In some embodiments, the method 884 further includes cooling the load with the CES at 896, as described herein such as by use of a load fluid loop.

The current disclosure provides a system and a method enabling the delivery of renewably generated cold energy, that can be supplied 24 hours per day. Supplying coolth from the system according to the current disclosure allows a large amount of contingent cold energy to be stored, rather than supply on demand directly with a refrigeration unit. In some embodiments, systems according to the present disclosure provide flexibility to supply cold fluid within a cooling circuit to a thermal load, such as a datacenter. It therefore provides dispatchable, low-cost solar-powered coolth, that can be delivered at any time of day and/or night at low capital costs and limited or no exposure to power market pricing. While embodiments herein are described in relation to a datacenter systems and methods described herein may be applied to any appropriate thermal and/or electrical load.

INDUSTRIAL APPLICABILITY

The present disclosure relates generally to cooling a system using renewable energy with a decreased cost and/or improved efficiency. More particularly, the present disclosure relates to the generation, storage, and distribution of coolth through a fluid medium to one or more structures or systems that require cooling. In some embodiments, the heat transferred to the fluid medium during cooling of the structure or system is exhausted to ambient atmosphere. In some embodiments, the heat transferred to the fluid medium during cooling of the structure or system is harvested for storage and/or use in a thermodynamic generator.

In some embodiments, a power generation system according to the present disclosure includes a combination of solar energy capture and thermal energy storage that generates both heat and coolth to generate dispatchable energy any time of day and capable of storing energy for periods of up to weeks or months.

The solar energy generation system, in some embodiments, includes a load, such as a datacenter. In some embodiments, the load is a thermal load. In some embodiments, the load is a thermal and electrical load. The load generally includes devices requiring power, such as servers in the datacenter. It also may include a fluid circuit (not shown) to handle the temperature within the load. The fluid circuit, in some embodiments, circulates a load fluid in the load to cool the load appropriately. The load fluid may be air or a liquid such as water and the load fluid circuit may deliver the fluid to the whole building or only to part of the building that have specific thermal requirements. In an embodiment where the load is a datacenter the load fluid may be a dielectric fluid in which the servers are immersed. In another embodiment where the load is a datacenter, the load fluid is air, and the building fluid circuit is set up so that the air circulates between the server racks and/or the servers. In some embodiments, the load fluid circulates to and/or through an air handling unit (AHU) of the load to transfer heat between the air of the load structure and the load fluid.

Cold water at 0-25 °C can be supplied to the load to provide cooling needs (e.g., in the load fluid circuit or to cool the load fluid in the load fluid circuit via a heat exchanger). The cold water may be supplied directly from the refrigeration unit or from the cold pit. The return water from the datacenter can either be returned to the HES or cooled with ambient air (for instance in a cooling tower) and returned to the CES. Evaporative cooling may be used if water availability is not an issue. In some embodiments, a valve directs a portion or all of the return water toward a cool return water line or toward a warm return water line based at least partially on a temperature of the return water. In some embodiments, a valve directs a portion or all of the return water toward a cool return water line or toward a warm return water line based at least partially on an ambient atmospheric temperature. In some embodiments, the valve directs a portion or all of the return water toward a cool return water line or toward a warm return water line based at least partially a temperature difference between the return water and the ambient atmospheric temperature. In some embodiments, the valve directs a portion or all of the return water toward a cool return water line or toward a warm return water line based at least partially on a temperature difference between the return water and a CES temperature and/or an HES temperature.

In some embodiments, a controller is in data communication with a valve or other device for directing flow of the return water from the datacenter or other thermal load. In some embodiments, the controller may be integrated with and/or part of the thermal load (e.g., in the illustrated embodiment, the datacenter). In some embodiments, the controller is independent of the thermal load. For example, the controller may be integrated with the valve.

In some embodiments, the controller determines a direction of the return and/or a proportion of the return water based at least partially on a return water temperature. For example, the controller may receive a temperature measurement of the return water temperature and compare the return water temperature to a threshold value. In some embodiments, return water with a return water temperature greater than the threshold value is directed to a warm return water line and toward the HES. For example, the warm return water may add heat to the HES. In some embodiments, return water with a return water temperature less than the threshold value is directed to a cool return water line and toward the CES. For example, the cool return water may add coolth to the CES. The threshold value may be the ambient temperature. In another embodiment, the valve may be downstream of the optional cooling tower.

In some embodiments, the warm return water may be cooler than the hot water of the HES, and the cooler water in the HES and/or from the warm return line is recirculated to the PV module(s) through a PV water return line. In some embodiments, after receiving heat from the PV module(s), the water (or other fluid) returns to the HES through a PV water supply line.

The HES including a fluid thermal mass, in some embodiments, has a thermocline in the fluid thermal mass that marks a relatively abrupt transition between a hot region and a warm region that are in direct contact with one another and share a fluid across the thermocline. The hot region of the fluid thermal mass has a higher temperature than the warm region of the fluid thermal mass. In some embodiments, warm return water from the warm return water line is supplied to the warm region through a port or other ingress into the HES below the hot region. For example, the port or other ingress for the warm return water may introduce the warm return water in a laminar flow to limit and/or prevent turbulence and mixing of the fluid thermal mass across the thermocline.

In some embodiments, hot water from the PV water supply line enters at the hot region of the HES (e.g., fluid pit or tank) above the warm region through a port or other ingress above the thermocline. For example, the port or other ingress for the hot water from the PV water supply line may introduce the hot water in a laminar flow to limit and/or prevent turbulence and mixing of the fluid thermal mass across the thermocline.

In some embodiments, the PV water return line extracts warm water from the warm region of the HES. For example, the PV water return line may extract warm water (or other fluid) from the warm region of the HES in a laminar flow to limit and/or prevent turbulence and mixing of the fluid thermal mass across the thermocline. The PV water return line provides the warm water to the PV modules or other portion of the solar collector to receive the thermal energy from the sunlight. The heated water from the solar collector is then provide to the HES from the PV water supply line. In some embodiments, at least a portion of the hot region of the HES and at least a portion of the warm region of the HES has a temperature difference of greater than 30 °C. In some embodiments, at least a portion of the hot region of the HES and at least a portion of the warm region of the HES has a temperature difference of greater than 45 °C. In some embodiments, at least a portion of the hot region of the HES and at least a portion of the warm region of the HES has a temperature difference of greater than 60 °C. In at least one example, the warm region has a warm temperature range including approximately 25 °C and the hot region has a hot temperature range including approximately 90 °C or higher.

In some embodiments, hot water from the hot region is extracted to the thermodynamic generator. In some embodiments, hot water is extracted from the hot region of the HES (e.g., fluid pit or tank) above the warm region through a port or other egress above the thermocline. For example, the port or other egress for the hot water may extract the hot water in a laminar flow to limit and/or prevent turbulence and mixing of the fluid thermal mass across the thermocline. The heat from the hot water is used in a thermodynamic cycle of the thermodynamic generator to generate electricity.

The electric power produced by the photovoltaic panels may be used to operate the refrigeration unit that charges the CES, as previously explained herein, and/or to supply electrical power to the datacenter.

When solar energy is not available and electrical power is required, heat from the HES may be used to generate power using a thermodynamic cycle generator, such as an ORC generator. In this embodiment, a second fluid, such as ambient air, may be used in the generator cycle. Alternatively, the second fluid may be a cold fluid from the CES. This electrical power may be used to meet the datacenter needs or for operating the refrigeration unit.

In some embodiments, the CES includes a thermocline similar to that of the HES; above which a cool region includes a cool water or other fluid thermal mass, and below which a cold region includes a cold water or other fluid thermal mass that are in direct contact with one another and share a fluid across the thermocline. In some embodiment, the cold region is in a cold temperature range at or near a freezing temperature of the fluid thermal mass (such as being 0 °C to 10 °C of a water-based CES or less for a saltwater-based CES). In some embodiments, the cool region is in a cool temperature range that is warmer than the cold region (such as being 10 °C to 25 °C).

A cold water supply line, in some embodiments, provides cold water from the refrigeration unit to the cold region of the CES. In some embodiments, the cold water supply line provides the cold water to the cold region through a port or other ingress to the CES in a laminar flow to limit and/or prevent turbulence and mixing of the fluid thermal mass in the CES. In some embodiments, the cold water supply line selectively and/or partially provides the cold water directly to the thermal load (e.g., the datacenter) to cool the thermal load.

In some embodiments, a cool return water line provides return water from the thermal load toward the cool region of the CES through a port or other ingress to the CES in a laminar flow to limit and/or prevent turbulence and mixing of the fluid thermal mass in the CES. In some embodiments, the cool return water line provides return water from the thermal load to a cooling tower or other intermediate cooling device to lower a temperature of the return water before the return water is added to the CES. For example, the cooling tower may cool the return water before the cooled return water is added to the cool region of the CES. In some examples, the cooling tower may cool the return water before the cooled return water is added to the cold region of the CES.

In some embodiments, the cooling tower or other cooling device lowers the temperature of the return water by passive cooling. For example, the cooling tower may cool the return water through passive exhaustion of heat from the return water to the ambient atmosphere. In some embodiments, the controller in communication with the valve directing the return water from the datacenter or other thermal load, directs the return water to the cooling tower based at least partially on the ambient atmospheric temperature.

In some embodiments, the cooling tower or other cooling device lowers the temperature of the return water by evaporative cooling. For example, the cooling tower may cool the return water through exhaustion of heat from the return water to a secondary fluid that is evaporated from the cooling tower. The evaporation of the secondary fluid exhausts heat through the latent heat of boiling. Evaporative cooling capacity, however, may be limited by the ambient temperature, air pressure, and/or humidity. In some embodiments, the controller in communication with the valve directing the return water from the datacenter or other thermal load, directs the return water to the cooling tower for evaporative cooling based at least partially on the ambient atmospheric temperature. In some embodiments, the controller in communication with the valve directing the return water from the datacenter or other thermal load, directs the return water to the cooling tower for evaporative cooling based at least partially on the ambient atmospheric humidity. In some embodiments, the controller in communication with the valve directing the return water from the datacenter or other thermal load, directs the return water to the cooling tower for evaporative cooling based at least partially on the dew point. In some embodiments, the controller in communication with the valve directing the return water from the datacenter or other thermal load, directs the return water to the cooling tower for evaporative cooling based at least partially on a wet-bulb temperature.

At night or other conditions when the electricity and heat available through the solar field are insignificant, the load is, in some embodiments, cooled using the coolth from the CES. The thermodynamic generator, in some embodiments, produces electricity using the heat from the HES, and this electricity is used to power the load, and/or the refrigeration unit. Additional electricity may be used from batteries and/or from the grid to power the refrigeration unit and/or the load as described herein.

In another embodiment, the system is connected to the electrical grid. In such a case, when the electricity cost from the grid is low or negative (i.e., negative power price), the refrigeration unit can use this low/no cost electricity to add coolth to the CES. In some embodiments, the CES is used to provide coolth to the datacenter at any time of day and/or night. As described herein, after receiving heat from the thermal load (e.g., datacenter), the return water is selectively directed by a valve toward the HES and/or CES. Additionally, when operating the thermodynamic generator (e.g., an ORC generator) in the evening or night, surplus electrical power may be exported to the grid at times when the power prices are high.

In some embodiments, such as when an excess of cold water (or other cold fluid) is available in the CES, the thermodynamic generator is operated using the temperature difference between the HES and the CES for improved efficiency and higher power output relative to the temperature difference between the HES and ambient atmosphere.

In some embodiments, the system is completely off-grid and can autonomously cool and power the datacenter, without any connection to a regional power grid. While off-grid embodiments are described herein, it should be understood that any off-grid embodiment may be connected to a grid for additional reliability and redundancy in power supply and/or for exportation of surplus energy from the system to the regional power grid.

In some off-grid embodiments, additional solar collectors are used. In some embodiments, the system includes an additional electrical energy storage mechanism, such as batteries, for storing electrical energy. In some embodiments, other additional electrical energy storage mechanisms are used, such as pumped hydro storage, compressed air energy storage (CAES), or liquid air energy storage (LAES). The electrical energy storage mechanisms may be charged with energy from any of the PV modules and/or the thermodynamic generator.

In some embodiments, one or more PV modules are dedicated to providing power to the datacenter directly during solar generation hours (e.g., daytime). During this time, solar thermal energy is captured and stored in the HES. In some embodiments, the thermodynamic generator uses the HES as a heat source and the CES as a heat sink to produce generator electrical power during day. In some embodiments, the thermodynamic generator uses the HES as a heat source and the ambient atmosphere as a heat sink to produce generator electrical power during day. In some embodiments, the stored thermal energy may be used to generate power during times when solar generation is not possible (such as at night) by operating the thermodynamic generator and using the ambient temperature as a heat sink. In some embodiments, the coolth of the CES may be used to cool the thermal load when solar generation is not possible.

In some embodiments, one or more PV modules are dedicated to charging an electrical energy storage mechanism, such as batteries, for storing electrical energy for use at night, in adverse weather, or in periods of high electrical demand from the load. The solar collectors include solar thermal collectors that provide solar thermal energy (e.g., hot water) to the HES despite the PV electrical power being directed to the batteries. In some embodiments, the solar collectors selectively provide electrical energy to any of the thermodynamic generator, refrigeration unit, electrical energy storage devices (batteries, CAES, LAES) or loads (e.g., datacenter), as needed, and/or thermal energy to the HES. In some embodiments, the additional electrical energy storage devices provide power to the load (e.g., the datacenter). In some embodiments, the additional electrical energy storage devices provide power to the refrigeration unit, which provides coolth to the CES and to the thermal load (e.g., the datacenter). As described herein, after receiving heat from the thermal load, the return water is selectively directed by a valve toward the HES and/or CES.

In some embodiments, the electrical energy storage mechanism may be replaced/complemented by additional thermal energy sources and/or storage such as a geothermal source. In some embodiments, a geothermal source provides additional heat to the thermodynamic generator when the solar collectors (e.g., PV modules and towers) are not providing heat, for instance at night, to the HES and the thermodynamic generator. In some embodiments, a geothermal source can supplement the heat in the HES, further allowing the thermodynamic generator to generate generator electrical power to operate the refrigeration unit and cool the CES while maintaining a sufficient temperature of the HES. For example, the thermodynamic generator may generate electricity during night while the temperature of the HES remains in a steady-state. In some examples, the geothermal source allows the HES to maintain temperature (e.g., remain at the same temperature) overnight even while heat is lost to the ambient atmosphere or to the ambient ground around the HES. In some embodiments, a geothermal source can supplement the heat in the HES, further allowing the thermodynamic generator to generate generator electrical power to operate the refrigeration unit and cool the thermal load. As described herein, after receiving heat from the thermal load, the return water is selectively directed by a valve toward the HES and/or CES. In some embodiments, additional passive sources of heat to the HES may increase the efficiency of the system.

In some embodiments, additional cooling of the return water further increases the efficiency of the system. In some embodiments, a system includes ground source cooling to passively exhaust heat from the return water directed toward the CES. As described herein, after receiving heat from the thermal load, the return water is selectively directed by a valve toward the HES and/or CES. A ground source is, in some embodiments, a shallow geothermal well to allow thermal transfer between the ground and the return water. In some embodiments, a ground source includes one or more shallow wellbores, for instance an array of shallow wellbores. The ground source may be used to cool the cool return water line from the thermal load (via the valve) by exchanging heat with the subsurface formation. In some examples, a plurality of ground source wells are rotated to allow heat introduced to the subsurface formation to dissipate. For example, the return water may exchange heat in a first ground source well for a predetermined period of time (e.g., six months), after which the return water may be directed to a second ground source well for a second predetermined period of time (e.g., six months) to allow the heat introduced the first ground source well to dissipate. After the second predetermined period of time, the return water may be directed toward the first ground source well again or toward yet another ground source well.

It should be understood that, in some embodiments, the cooling tower and a ground source well are in series with the same return water flowing through both the cooling tower and the ground source well. In some examples, the return water flows through the cooling tower first and the ground source well second. In some examples, the return water flows through the cooling tower second and the ground source well first. In some embodiments, the valve is controlled by a controller that directs the return water based at least partially on the subsurface formation and/or ground source temperature. In some examples, the controller may control the valve based at least partially on the ambient atmospheric temperature. In some examples, the controller may control the valve based at least partially on the subsurface formation and/or ground source temperature to direct return water toward the CES when the subsurface formation and/or ground source temperature is below a threshold value. In some examples, the controller may control the valve based at least partially on a temperature difference between the subsurface formation and/or ground source temperature and the return water temperature to direct return water toward the CES.

In some embodiments, a method of providing power and cooling to a load includes receiving sunlight at least at a solar collector, such as a solar collector described herein, and transferring solar heat from the sunlight to an HES via the solar collector. In some embodiments, the method includes comparing the sunlight to a first threshold and determining wherein the quantity and/or intensity of the sunlight is greater than the first threshold.

In some embodiments, comparing the sunlight to a first threshold includes measuring at least one of a variety of properties of the sunlight and/or a product of the solar collector from the sunlight. For example, the first threshold may be a threshold value of a brightness of the available sunlight incident on the solar collector. In another example, the first threshold may be a threshold value of a fluence of the sunlight incident on a surface of the solar collector. In yet another example, the first threshold may be a threshold value of a solar electrical power produced by a PV module of the solar collector. In at least one example, cloud cover or other atmospheric conditions can affect the spectrum of the sunlight incident on the solar collector, changing the amount of electrical power produced even when the brightness of the sunlight remains the same. In a further example, the first threshold may be a threshold value of a solar heat received by a fluid of the solar collector.

Based at least partially on the amount of sunlight being greater than the first threshold, the method includes providing solar electrical power from the solar collector (e.g., via a PV module of the solar collector) to a refrigeration unit and to a load. In some embodiments, the solar electrical power provided to the refrigeration unit allows the method to include cooling a CES using the refrigeration unit. In some embodiments, the method further includes cooling the load with the CES, as described herein such as by use of a load fluid loop.

Based at least partially on the amount of sunlight being not greater than the first threshold, the method includes producing generator electrical power using a thermodynamic generator using the HES and ambient air (e.g., via a PV module of the solar collector). In such instances, the solar electrical power may be insufficient to power the refrigeration unit and/or the load. The method further includes providing the generator electrical power to the load.

In some embodiments, any solar electrical power generated, even below a threshold value, may be provided to the load to supplement the generator electrical power. In some embodiments, the method further includes cooling the load with the CES, as described herein such as by use of a load fluid loop.

The current disclosure provides a system and a method enabling the delivery of renewably generated cold energy, that can be supplied 24 hours per day. Supplying coolth from the system according to the current disclosure allows a large amount of contingent cold energy to be stored, rather than supply on demand directly with a refrigeration unit. In some embodiments, systems according to the present disclosure provide flexibility to supply cold fluid within a cooling circuit to a thermal load, such as a datacenter. It therefore provides dispatchable, low-cost solar-powered coolth, that can be delivered at any time of day and/or night at low capital costs and limited or no exposure to power market pricing. While embodiments herein are described in relation to a datacenter systems and methods described herein may be applied to any appropriate thermal and/or electrical load.

The Present Disclosure Relates to Systems and Methods According to any of the Following:

Clause 1. A system comprising: a solar collector configured to receive sunlight, wherein the solar collector includes a solar thermal collector and a photovoltaic (PV) module; a hot energy storage (HES) configured to receive solar heat from the solar thermal collector and heat the HES to a first temperature range; a cold energy storage (CES); a refrigeration unit for cooling the CES to a second temperature range less than the first temperature range; a thermodynamic generator configured to provide electricity to the refrigeration unit based on a temperature difference between the HES and a heat sink; and a load including one or more electrical devices and a load fluid circuit for cooling the load, wherein the load fluid circuit is in thermal communication with the CES.

Clause 2. The system of clause 1, wherein the heat sink is ambient air.

Clause 3. The system of clause 1 or 2, wherein the heat sink is the CES.

Clause 4. The system of any preceding clause, wherein the refrigeration unit is at least partially powered by the PV module.

Clause 5. The system of any preceding clause, wherein the load is a datacenter.

Clause 6. The system of any preceding clause, wherein the CES includes a cold region in a cold temperature range and a cool region in a cool temperature range, wherein the cold region and the cool region share a fluid in direct contact across a thermocline.

Clause 7. The system of clause 6, wherein the cold temperature range is below 10 °C and the cool temperature range is between 10 °C and 25 °C.

Clause 8. The system of clause 7, wherein at least a portion of a return water is provided to the cool region in a laminar flow.

Clause 9. The system of any preceding clause, wherein the HES includes a hot region in a hot temperature range and a warm region in a warm temperature range, wherein the hot region and the warm region share a fluid in direct contact across a thermocline.

Clause 10. The system of clause 9, wherein the hot temperature range is greater than 90 °C and the warm temperature range is between 25 °C and 90 °C.

Clause 11. The system of clause 10, wherein at least a portion of a return water is provided to the warm region in a laminar flow.

Clause 12. The system of any preceding clause, wherein the HES or the CES is thermally insulated.

Clause 13. The system of any preceding clause, wherein the system is electrically connected to a regional power grid.

Clause 14. The system of any preceding clause, further comprising one or more additional energy storage units configured to receive electrical power from the PV module.

Clause 15. The system of clause 14, wherein the one or more additional energy storage units include one or more of a battery, a compressed air energy storage device, a liquid air energy storage device, and a pumped hydro storage device.

Clause 16. The system of any preceding clause, further comprising a geothermal well producing geothermal heat, wherein the geothermal heat is provided to the HES and/or to the thermodynamic generator.

Clause 17. A system comprising: a solar collector configured to receive sunlight, wherein the solar collector includes a solar thermal collector and a photovoltaic (PV) module; a hot energy storage (HES) configured to receive solar heat from the solar thermal collector and heat the HES to a first temperature range; a cold energy storage (CES); a refrigeration unit for cooling the CES to a second temperature range less than the first temperature range; a thermodynamic generator configured to provide electricity to the refrigeration unit based on a temperature difference between the HES and a heat sink; a load including one or more electrical devices and a load fluid circuit for cooling the load, wherein the load fluid circuit is in thermal communication with the CES; and a valve configured to selectively direct return water from the load toward at least one of the HES and the CES.

Clause 18. The system of clause 17, further comprising a controller configured to control the valve based at least partially on a return water temperature.

Clause 19. The system of clause 17 or 18, further comprising a controller configured to control the valve based at least partially on an ambient atmospheric temperature.

Clause 20. The system of any of clauses 17 through 19, further comprising a controller configured to control the valve based at least partially on an ambient dew point.

Clause 21. The system of any of clauses 17 through 20, further comprising a controller configured to control the valve based at least partially on an ambient wet-bulb temperature.

Clause 22. The system of any of clauses 17 through 21, further comprising a controller configured to control the valve based at least partially on a subsurface formation temperature.

Clause 23. The system of any of clauses 17 through 22, further comprising a cooling tower configured to receive return water from the load fluid circuit, wherein the cooling tower lowers a return water temperature before the return water returns to the CES.

Clause 24. The system of any of clauses 17 through 23, further comprising a ground source configured to cool at least a portion of the return water.

Clause 25. A method of cooling a load comprising: receiving sunlight at least at a solar collector; transferring solar heat from the sunlight to a hot energy storage (HES) via the solar collector; providing solar electrical power from the solar collector to a refrigeration unit; cooling a cold energy storage (CES) using the refrigeration unit; cooling the load with the CES; and producing generator electrical power using a thermodynamic generator and heat from the HES.

Clause 26. The method of clause 25, further comprising providing the generator electrical power from the thermodynamic generator to the load.

Clause 27. The method of clause 25 or 26, further comprising providing the solar electrical power from the thermodynamic generator to the load.

Clause 28. The method of any of clauses 25 through 27, wherein producing the generator electrical power using the thermodynamic generator further includes using coolth from the CES.

Clause 29. The method of any of clauses 25 through 28, wherein cooling the load includes providing a cold fluid from the CES or refrigeration unit to the load in a load fluid circuit.

Clause 30. The method of any of clauses 25 through 29, further comprising changing a valve to direct a return fluid from the load toward at least one of the HES and the CES.

Clause 31. A method of providing electrical power and cooling to a load, the method including: receiving sunlight at a solar collector including a solar thermal collector and a photovoltaic (PV) module; generating solar electrical power using the PV module; providing solar heat from the solar thermal collector to a hot energy storage (HES) to heat the HES to a first temperature range; when the sunlight received at the solar collector is greater than a first threshold: providing the solar electrical power to the load and to a refrigeration unit, cooling a cold energy storage (CES) using the refrigeration unit to a second temperature range less than the first temperature range, using one of the refrigeration unit and the CES to cool the load via a load fluid circuit; and when the sunlight received at the solar collector is not greater than the first threshold: providing the solar electrical power to the load, using the CES to cool the load via the load fluid circuit, generating generator electrical power using the temperature difference between the HES and a heat sink, wherein the heat sink is ambient air, and providing the thermodynamic generator electricity to the load.

Clause 32. The method of clause 31, wherein when the sunlight received at the solar collector is greater than the first threshold: the PV modules are configured to provide surplus electrical power to an additional energy storage device after providing solar electrical power to the load and/or the refrigeration unit.

Clause 33. The method of clause 32, wherein when the sunlight received at the solar collector is not greater than the first threshold: the additional energy storage device is configured to provide electrical power to the load.

Clause 34. A system according to any embodiment disclosed in or derived from the current disclosure.

Clause 35. A method according to any embodiment disclosed in or derived from the current disclosure.

It should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, to the extent such features are not described as being mutually exclusive. Numbers, percentages, ratios, or other values stated herein are intended to include that value, and also other values that are "about", "substantially", or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims. The described embodiments are therefore to be considered as illustrative and not restrictive, and the scope of the disclosure is indicated by the appended claims rather than by the foregoing description.

What is claimed is:

1. A system comprising:

a solar collector configured to receive sunlight, wherein the solar collector includes a solar thermal collector and a photovoltaic (PV) module;

a hot energy storage (HES) configured to receive solar heat from the solar thermal collector and heat the HES to a first temperature range greater than 25 °C and less than 100 °C, wherein the HES includes a hot region in a hot temperature range and a warm region in a warm temperature range, wherein the hot region and the warm region share a fluid in direct contact across a thermocline;

a cold energy storage (CES);

a thermodynamic generator configured to provide electricity based on a temperature difference between the HES and a heat sink using hot water from the hot region of the HES, wherein the thermodynamic generator is connected to the hot region of the HES via a hot outlet port above the warm region to extract the hot water in a first laminar flow to prevent turbulence and mixing of a fluid thermal mass across the thermocline;

a refrigeration unit configured to cool the CES to a second temperature range less than the first temperature range, wherein electrical power for the refrigeration unit is provided by the PV module and the thermodynamic generator, wherein the second temperature range is between 0 °C and 10 °C in a cold region of the CES;

a load including one or more electrical devices and a load fluid circuit configured to cool the load, wherein the load fluid circuit is in thermal communication with the CES, wherein electrical power for the load is supplied by the PV module and the thermodynamic generator;

a return water line receiving return water from the load;

a warm water return line connected to the HES at the warm region via a warm inlet port below the hot region to introduce the return water to the warm region of the HES in a second laminar flow to prevent the turbulence and the mixing of the fluid thermal mass across the thermocline;

a cool water return line connected to the CES;

a valve having the return water line as a valve input and valve outputs including the cool water return line and the warm water return line;

a controller integrated with the valve, wherein the controller is configured to operate the valve to direct the return water from the return water line to the warm water return line or the cool water return line based on a return temperature of the return water and a temperature difference between the return temperature and an ambient atmospheric temperature;

a PV water line fluidly coupled to the HES and the PV module, wherein the PV water line receives warm water from the warm region of the HES, directs the warm water to the PV module to heat the warm water, resulting in the hot water, and wherein the PV water line directs the hot water to the hot region of the HES in a third laminar flow; and a cooling tower on the return water line, wherein the valve is downstream of the cooling tower.

2. The system of claim 1, wherein the CES includes a cool region in a cool temperature range of between 10 °C and 25 °C, wherein the cold region and the cool region share a cold fluid in direct contact across the thermocline.

3. The system of claim 1, further comprising one or more additional energy storage units, wherein the one or more additional energy storage units include one or more of a battery, a compressed air energy storage device, a liquid air energy storage device, and a pumped hydro storage device.

4. The system of claim 1, further comprising a geothermal well producing geothermal heat, wherein the geothermal heat is provided to the HES and/or to the thermodynamic generator.

5. The system of claim 1, wherein the ambient atmospheric temperature includes an ambient wet-bulb temperature.

6. The system of claim 1, wherein the temperature difference includes a difference between the return temperature and a subsurface formation temperature.

7. The system of claim 1, wherein the cooling tower is configured to receive the return water from the load fluid circuit, wherein the cooling tower lowers a return water temperature before the return water returns to the CES.

8. The system of claim 1, wherein the heat sink is ambient air or the CES.

9. A method of cooling a load including one or more electrical devices comprising:

receiving sunlight at least at a solar collector including a solar thermal collector and a photovoltaic (PV) module;

transferring solar heat from the sunlight to a hot energy storage (HES) via the solar collector and heating hot water to a first temperature range greater than 25 °C and less than 100 °C, wherein the HES includes a hot region in a hot temperature range and a warm region in a warm temperature range, wherein the hot region and the warm region share a fluid in direct contact across a thermocline;

returning, with a first laminar flow to prevent turbulence and mixing of a fluid thermal mass across the thermocline, the hot water from the PV module to the hot region of the HES, wherein the first laminar flow is flowed into the hot region of the HES via a hot inlet port on the HES, wherein the hot inlet port is located on the HES above the warm region;

providing solar electrical power from the solar collector to a refrigeration unit;

cooling a cold energy storage (CES) to a second temperature range less than the first temperature range using the refrigeration unit, wherein the second temperature range is between 0 °C and 10 °C in a cold region of the CES;

cooling the load with the CES via a load fluid circuit of the load, wherein the load fluid circuit is in thermal communication with the CES;

returning warm water from the load toward a cooling tower;

directing, using a controller integrated with a valve in communication with the HES and the CES and downstream of the cooling tower, the valve including the warm water from the cooling tower as an input and a warm water return line and a cool water return line as valve outputs, wherein the warm water return line is directed to the HES and the cool water return line is directed to the CES, wherein directing the warm water to the HES includes directing, with a second laminar flow to prevent the turbulence and the mixing of the fluid thermal mass across the thermocline, the warm water to the HES via a warm inlet port in the warm region, wherein the warm inlet port is located on the HES below the hot region, wherein the controller operates the valve to direct the warm water to the warm water return line or the cool water return line based on a return temperature of the warm water and a difference between the return temperature and an ambient atmospheric temperature;

directing, from a hot outlet port on the HES, a third laminar flow to prevent the turbulence and the mixing of the fluid thermal mass across the thermocline, the hot water from the hot region to a thermodynamic generator, wherein the hot outlet port is located on the HES at the hot region above the warm region; and producing electrical power using the thermodynamic generator and a temperature difference between the hot water and a heat sink.

10. The method of claim 9, further comprising providing the electrical power from the thermodynamic generator to the load.

11. The method of claim 9, wherein producing the electrical power using the thermodynamic generator includes producing the electrical power using the hot water as a heat source and the CES or ambient air as the heat sink.

12. The system of claim 1, wherein a storage temperature difference between the HES and the CES is approximately 90 °C.

13. The system of claim 1, wherein the warm region and the hot region have a hot temperature difference of greater than 60 °C.

14. The system of claim 1, wherein the PV module, the refrigeration unit, the thermodynamic generator, and the load are off grid and not connected to a power grid.

15. The system of claim 14, further comprising an energy storage mechanism for storing electrical energy.

16. The system of claim 1, wherein the controller is independent of the load.

* * * * *